US012800194B2

(12) United States Patent
Kawaguchi et al.

(10) Patent No.: US 12,800,194 B2
(45) Date of Patent: Nov. 17, 2026

(54) REFRIGERANT CIRCULATION SYSTEM

(71) Applicant: Mazda Motor Corporation, Aki-gun (JP)

(72) Inventors: Kentaro Kawaguchi, Aki-gun (JP); Yuma Miyauchi, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 163 days.

(21) Appl. No.: 18/976,030

(22) Filed: Dec. 10, 2024

(65) Prior Publication Data

US 2025/0244059 A1 Jul. 31, 2025

(30) Foreign Application Priority Data

Jan. 25, 2024 (JP) ................................ 2024-009470

(51) Int. Cl.

| | |
|---|---|
| ***F04B 39/02*** | (2006.01) |
| ***F25B 9/00*** | (2006.01) |
| ***F25B 49/02*** | (2006.01) |
| *B60H 1/00* | (2006.01) |

(52) U.S. Cl.

CPC .............. *F25B 9/008* (2013.01); *F04B 39/02* (2013.01); *F25B 49/02* (2013.01); *B60H 2001/00307* (2013.01); *F25B 2500/16* (2013.01); *F25B 2700/1931* (2013.01)

(58) Field of Classification Search

CPC ...... F04B 39/02; F04B 39/06; F04C 29/0007; F25B 9/008; B60H 2001/00307

See application file for complete search history.

(56) References Cited

U.S. PATENT DOCUMENTS

| | | | | |
|---|---|---|---|---|
| 11,300,335 | B2 * | 4/2022 | Muller | F04C 29/021 |
| 2015/0226467 | A1 * | 8/2015 | Sommer | H02K 9/10 62/505 |
| 2018/0356129 | A1 * | 12/2018 | Creamer | F04C 18/02 |
| 2023/0184475 | A1 | 6/2023 | Okada et al. | |

FOREIGN PATENT DOCUMENTS

| | | |
|---|---|---|
| JP | 2022023780 A | 2/2022 |

OTHER PUBLICATIONS

European Patent Office, Extended European Search Report Issued in Application No. 25152521.8, Jun. 6, 2025, Germany, 8 pages.

* cited by examiner

*Primary Examiner* — Jonathan Bradford
(74) *Attorney, Agent, or Firm* — Alleman Hall LLP

(57) ABSTRACT

A refrigerant circulation system which circulates refrigerant containing $CO_2$ therethrough includes a compressor which compresses the refrigerant, a motor including a rotor, a stator, a rotation shaft coupled to the rotor, and slide bearings supporting the rotation shaft and lubricated using the refrigerant compressed by the compressor. The system is configured so that the refrigerant passing through the inside of the motor expands after having flowed out of the slide bearings and is used for cooling of one of the rotor and the stator, and a control device which controls at least the motor. The motor further includes a flow rate adjustment mechanism able to adjust a flow rate of the refrigerant. The control device controls the flow rate adjustment mechanism of the motor to adjust a degree of overheat in a refrigeration cycle of the refrigerant realized by the refrigerant circulation system.

12 Claims, 7 Drawing Sheets

REFRIGERANT CIRCULATION SYSTEM

TECHNICAL FIELD

The present disclosure relates to a refrigerant circulation system which circulates refrigerant.

BACKGROUND OF THE DISCLOSURE

Conventionally, a refrigeration cycle used for air conditioners uses a refrigerant circulation system which circulates refrigerant. In general, this kind of refrigerant circulation system circulates the refrigerant, while changing the state of the refrigerant between a compressor, a heat exchanger (condenser), an expansion valve, and an evaporator.

In such a refrigerant circulation system, in order to prevent a failure of the compressor due to flowing the liquid-state refrigerant into the compressor (liquid flow-back/liquid return), a control is performed to heat the refrigerant by the evaporator with margin and supply the fully-gasified refrigerant to the compressor. In the refrigeration cycle, the degree of heating with margin is referred to as a "degree of overheat," and the degree of overheat can be obtained from a saturated vapor temperature according to a pressure before the compressor (i.e., a pressure of the evaporator) and a refrigerant temperature before the compressor. JP2022-023780A discloses a technology which controls such a degree of overheat of the refrigeration cycle.

Meanwhile, rolling bearings and slide bearings are used conventionally as bearings which support rotation shafts of power sources (an engine and a motor) of a vehicle. Here, if the rolling bearings are applied to a motor of an electric vehicle, since the rotation shaft of the motor rotates at a high rotational speed of over 30,000 rpm, for example, this poses a problem for the longevity of the bearings due to rolling fatigue. On the other hand, if typical slide bearings using oil as lubricant are applied to the motor, significant losses may occur due to oil agitation resistance acting against the rotation shaft of the motor.

SUMMARY OF THE DISCLOSURE

Therefore, the present inventors considered applying a motor to such a refrigerant circulation system, and slide bearings using refrigerant which circulates this system (especially, $CO_2$ refrigerant which becomes liquefied by compression of a compressor) as lubricant is applied to a rotation shaft of the motor. In addition, the present inventors considered making this motor function as a part of a refrigeration cycle according to the refrigerant circulation system (in detail, to make it function as an expansion valve and an evaporator in the refrigeration cycle). That is, the present inventors considered using the refrigerant which passes through the inside of the motor (evaporator) for cooling a rotor and a stator by letting the refrigerant expand (expansion valve) after it has flowed out of the slide bearings. It is still necessary to prevent the liquid-state refrigerant from flowing into the compressor downstream of the motor (liquid flow-back) in such a refrigerant circulation system including the motor.

Therefore, the present disclosure is made in view of solving the problems of the conventional technology described above, and one purpose thereof is to provide a refrigerant circulation system, in which slide bearings of a motor are lubricated by refrigerant, and the refrigerant expands inside the motor and is used for cooling, capable of preventing liquid-state refrigerant from flowing into a compressor.

In order to achieve the above-described purpose, the present disclosure provides a refrigerant circulation system configured to circulate refrigerant containing $CO_2$ therethrough, which includes a compressor which compresses the refrigerant, a motor, the motor including a rotor, a stator, a rotation shaft coupled to the rotor, and slide bearings supporting the rotation shaft, the slide bearings being lubricated using the refrigerant compressed by the compressor, wherein the motor is configured so that the refrigerant passing through the inside of the motor expands after having flowed out of the slide bearings, and is used for cooling of one of the rotor and the stator, and a control device which controls at least the motor. The motor is further provided with a flow rate adjustment mechanism configured to be able to adjust a flow rate of the refrigerant. The control device is configured to control the flow rate adjustment mechanism of the motor to adjust a degree of overheat in a refrigeration cycle of the refrigerant realized by the refrigerant circulation system.

According to such a configuration, in the refrigerant circulation system in which the slide bearings of the motor are lubricated by the refrigerant, and the motor functions as the expansion valve and the evaporator in the refrigeration cycle, the degree of overheat of the refrigeration cycle can be adjusted securely by the flow rate adjustment mechanism controlling the flow rate of the refrigerant of the motor. Therefore, according to the present disclosure, it can prevent the liquid-state refrigerant from flowing into the compressor downstream of the motor (liquid flow-back).

In the present disclosure, the control device may calculate the current degree of overheat in the refrigeration cycle, and when the degree of overheat is larger than a reference value, the control device may control the flow rate adjustment mechanism to increase the flow rate of the refrigerant, and, when the degree of overheat is smaller than the reference value, the control device may control the flow rate adjustment mechanism to decrease the flow rate of the refrigerant. According to this configuration, when the degree of overheat is larger than the reference value, the control device controls the flow rate adjustment mechanism to increase the flow rate of the refrigerant so as to decrease the degree of overheat, and, when the degree of overheat is smaller than the reference value, the control device controls the flow rate adjustment mechanism to decrease the flow rate of the refrigerant so as to increase the degree of overheat. Therefore, the degree of overheat can be maintained at the given reference value (target value), and it becomes possible to securely prevent the liquid flow-back to the compressor.

In the present disclosure, the refrigerant circulation system may further include a first pressure sensor which detects a pressure of the refrigerant after being compressed by the compressor, and a first temperature sensor which detects a temperature of the refrigerant before the refrigerant is supplied to the slide bearings of the motor. The control device may determine a target refrigeration capacity to be realized by the refrigeration cycle based on a calorific value of a coil applied to one of the rotor and the stator to be cooled. The control device may calculate a target expansion pressure after the refrigerant expands based on the target refrigeration capacity, the pressure detected by the first pressure sensor, and the temperature detected by the first temperature sensor. The control device may determine a target flow rate of the refrigerant by the flow rate adjustment mechanism for realizing the target expansion pressure. When the degree of overheat is larger than the reference value, the control device may perform a correction to increase the target flow rate, and when the degree of overheat is smaller than the reference value, the control device may perform a correction to decrease the target flow rate, and the control device may then control the flow rate adjustment mechanism based on the corrected target flow rate. According to this configuration, both cooling of the inside the motor by the refrigerant and prevention of the liquid flow-back to the compressor can be achieved securely.

In the present disclosure, the refrigerant circulation system may further include a second pressure sensor which detects a pressure of the refrigerant after having flowed out of the slide bearings, and a second temperature sensor which detects a temperature of the refrigerant after used for cooling of one of the rotor and the stator. The control device may be configured to calculate the current degree of overheat in the refrigeration cycle based on the pressure detected by the second pressure sensor and the temperature detected by the second temperature sensor. According to this configuration, the current degree of overheat (actual degree of overheat) of the refrigeration cycle can be obtained with sufficient accuracy.

In the present disclosure, when the degree of overheat calculated based on the pressure detected by the second pressure sensor and the temperature detected by the second temperature sensor is a first degree of overheat, the control device may additionally calculate a second degree of overheat estimated based on the calorific value of the coil and the target refrigeration capacity. The control device may correct the target flow rate according to a difference between the first degree of overheat and the second degree of overheat. According to this configuration, the refrigeration circulation system can securely carry out the feedback control of the flow rate adjustment mechanism according to the difference between the first degree of overheat (actual degree of overheat) and the second degree of overheat (estimated degree of overheat), that is, the estimated error of the degree of overheat.

In the present disclosure, the motor may further be provided with guide parts which direct the refrigerant immediately after having flowed out of the slide bearings toward the coil applied to one of the rotor and the stator to be cooled. The flow rate adjustment mechanism may be configured to be able to adjust the flow rate of the refrigerant by moving one of the guide parts and the slide bearings in an axial direction so that the size of a gap from which the refrigerant flows out is changed, the gap being located between the guide part and an end of the slide bearing on the guide part side. According to this configuration, by the flow rate adjustment mechanism changing the size of the gap between the guide part and the end of the slide bearing, the flow rate of the refrigerant to be supplied for cooling one of the rotor and the stator of the motor can be adjusted accurately.

DETAILED DESCRIPTION OF THE DISCLOSURE

Hereinafter, a refrigerant circulation system according to one embodiment is described with reference to the accompanying drawings.

[Overall Configuration]

Figure 1:
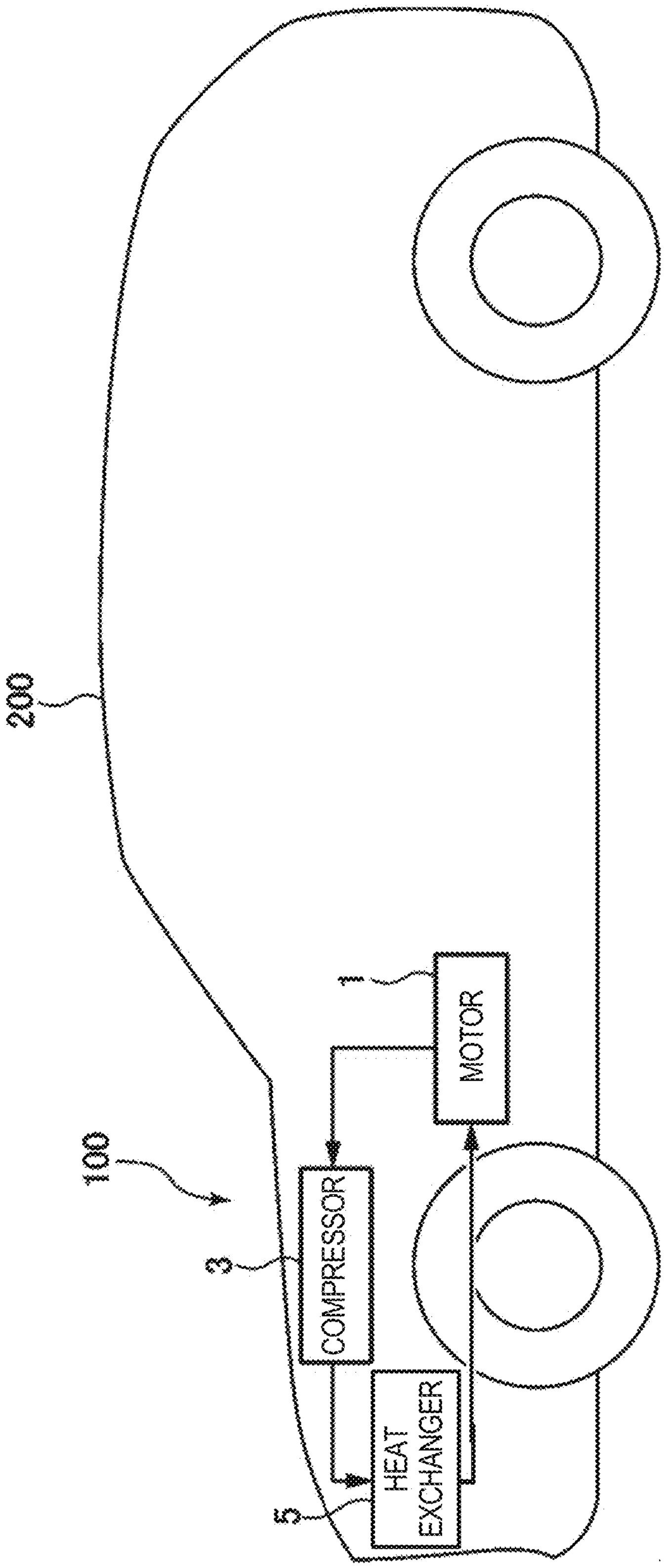
FIG. 1 is a schematic diagram illustrating a vehicle to which a refrigerant circulation system according to one embodiment of the present disclosure is applied.

First, referring to FIG. 1, the entire configuration of the refrigerant circulation system according to this embodiment is described. FIG. 1 is a schematic diagram illustrating a vehicle to which the refrigerant circulation system according to this embodiment is applied.

As illustrated in FIG. 1, a vehicle 200 is, for example, an electric vehicle with a refrigerant circulation system 100 which circulates refrigerant in a refrigeration cycle. The refrigerant circulation system 100 has a motor (e.g., electric motor) 1 which generates power for driving the vehicle 200, a compressor 3 for compressing refrigerant to be supplied to the motor 1, and a heat exchanger 5 provided with a condenser and a fan, to cool the refrigerant compressed by the compressor 3.

The refrigerant circulation system 100 circulates $CO_2$ refrigerant (refrigerating machine oil and additives may be included) as natural refrigerant. Therefore, the compressor 3 is configured so that the refrigerant is compressed at very high pressure. The motor 1 functions as an expansion valve and an evaporator in the refrigeration cycle (described later in detail) by using the refrigerant compressed by the compressor 3 for lubricating slide bearings which support a rotation shaft, and cooling a rotor and a stator. For example, in the refrigerant circulation system 100, high-temperature (hot) liquid refrigerant is supplied to the heat exchanger 5 from the compressor 3, low-temperature (cold) liquid refrigerant is supplied from the heat exchanger 5 to the motor 1, and high-temperature (hot) gas refrigerant is supplied from the motor 1 to the compressor 3. In this case, cooling inside the motor 1 is performed by latent heat of vaporization of the refrigerant. Note that the refrigerant which circulates such a refrigerant circulation system 100 may be shared with an air conditioner which performs air-conditioning inside the vehicle 200.

[Configuration of Motor]

Figure 2:
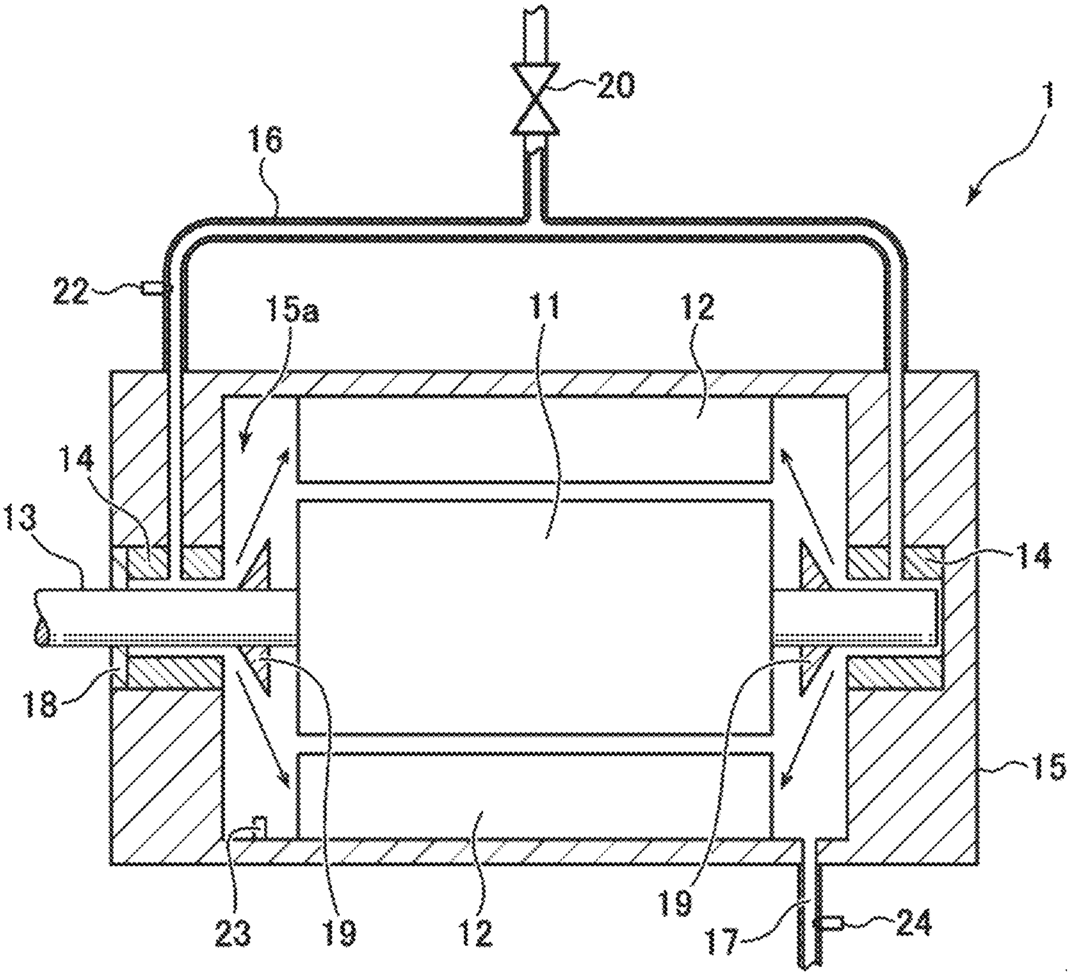
FIG. 2 is a schematic diagram illustrating a motor according to this embodiment.

Next, a configuration of the motor 1 according to this embodiment is described with reference to FIG. 2. FIG. 2 is a schematic diagram of the motor 1 according to this embodiment. In detail, FIG. 2 is a cross-sectional view of the motor 1, when seen in the axial direction.

As illustrated in FIG. 2, the motor 1 is a system mainly having a rotor 11 and a stator 12, a rotation shaft 13 coupled at one end to a transaxle (not illustrated) of the vehicle 200 and coupled at the other end to this rotor 11, a pair of slide bearings 14 which support the rotation shaft 13, and a housing 15 which accommodates the rotor 11, the stator 12, the rotation shaft 13, and the slide bearings 14.

The motor 1 further has a refrigerant supply passage 16 which supplies the refrigerant compressed by the above-described compressor 3 to the slide bearings 14. In detail, the refrigerant supply passage 16 supplies the refrigerant to a gap between the rotation shaft 13 and the slide bearings 14. The slide bearings 14 are lubricated by refrigerant ($CO_2$ refrigerant) supplied from the refrigerant supply passage 16, which is used as lubricant. Typically, the slide bearings 14 are lubricated using liquefied refrigerant.

Here, if rolling bearings are applied to the motor 1, for example, in the electric vehicle, since the rotation shaft 13 of the motor 1 rotates at a high rotational speed of over 30,000 rpm, this poses a problem for the longevity of the bearings due to rolling fatigue. On the other hand, if general slide bearings using oil are applied to the motor 1, significant losses may occur due to oil agitation resistance acting against the rotation shaft 13. Therefore, in this embodiment, slide bearings 14 using refrigerant ($CO_2$ refrigerant) which is liquefied by compression of the compressor 3 is applied to the motor 1. Therefore, the problems, such as the rolling fatigue and the oil agitation resistance, can be solved.

In this way, the refrigerant used as lubricant by the slide bearings 14 is then supplied to the rotor 11 and the stator 12 to be used for cooling. In detail, in the motor 1, a coil (not illustrated) is provided to the stator 12, and the refrigerant is used for cooling of the coil of the stator 12. Especially, the motor 1 has a pair of substantially truncated cone shaped guide parts 19 provided on the rotation shaft 13 so that they oppose the corresponding slide bearings 14 (penetrating the rotation shaft 13), and the guide parts 19 direct the refrigerant which flows out of (is discharged from) the gap between the rotation shaft 13 and the slide bearings 14 toward the coil of the stator 12 (see arrows in FIG. 2). Each guide part 19 has a surface which opposes the gap between the rotation shaft 13 and the slide bearing 14 and is inclined. That is, the guide part 19 has an inclined surface which directs the refrigerant toward the coil (especially, toward the coil end) of the stator 12 so that the refrigerant is sprayed onto the coil to be evaporated.

Such a motor 1 functions as an expansion valve, because the refrigerant is supplied from the gaps between the rotation shaft 13 and the slide bearings 14 to a space 15*a* inside the housing 15 where the rotor 11 and the stator 12 are provided, to be reduced in the pressure, and the motor 1 also functions as an evaporator, because this refrigerant exchanges heat with the comparatively hot stator 12 (the refrigerant is sprayed onto the coil of the stator 12 and evaporated). The refrigerant used for cooling (heat exchange) in this way is discharged from a refrigerant discharge passage 17 of the motor 1, and returns to the compressor 3 (FIG. 1).

Note that, as illustrated in FIG. 2, the refrigerant is not limited to be supplied to the stator 12 via the slide bearings 14, but the refrigerant may be supplied directly to the stator 12. In this case, the refrigerant may be supplied to the stator 12 via the expansion valve. Further, in the motor in which the coil is provided to the rotor 11 instead of the stator 12, the refrigerant may be used for cooling of the coil of the rotor 11.

Further, the motor 1 further has a sealing member 18 for sealing the slide bearing 14 provided on the rotation shaft 13 side which is connected to the transaxle. This sealing member 18 is provided to the housing 15 to prevent leakage of the refrigerant from the gap between the slide bearing 14 and the rotation shaft 13 to the outside. On the other hand, such a sealing member 18 is not provided to the other slide bearing 14 which is located on the opposite side of the rotation shaft 13 side connected to the transaxle, but the gap between the slide bearing 14 and the rotation shaft 13 is sealed by being covered with the housing 15.

The motor 1 further has, on the refrigerant supply passage 16, a flow regulating valve 20 as a "flow rate adjustment mechanism" which is able to adjust a flow rate of the refrigerant to be supplied into the motor 1. Further, the motor 1 is also provided with a first temperature sensor 22 which detects a temperature of the refrigerant before it is supplied to the slide bearings 14 (i.e., a temperature of the refrigerant supplied from the heat exchanger 5 to the motor 1), a second pressure sensor 23 which detects a pressure of the refrigerant after it has flowed out of the slide bearings 14 (i.e., a pressure of the refrigerant inside the space 15*a* of the housing 15), and a second temperature sensor 24 which detects a temperature of the refrigerant after used for cooling of the stator 12 (i.e., a temperature of the refrigerant supplied from the motor 1 to the compressor 3). In detail, the first temperature sensor 22 is provided to the refrigerant supply passage 16, the second pressure sensor 23 is provided inside the space 15*a* of the housing 15, and the second temperature sensor 24 is provided to the refrigerant discharge passage 17. Note that the locations where the first temperature sensor 22, the second pressure sensor 23, and the second temperature sensor 2 are provided are not limited to the locations illustrated in FIG. 2, as long as the temperature and pressure which are described above are detectable.

[Electric Configuration of Refrigerant Circulation System]

Figure 3:
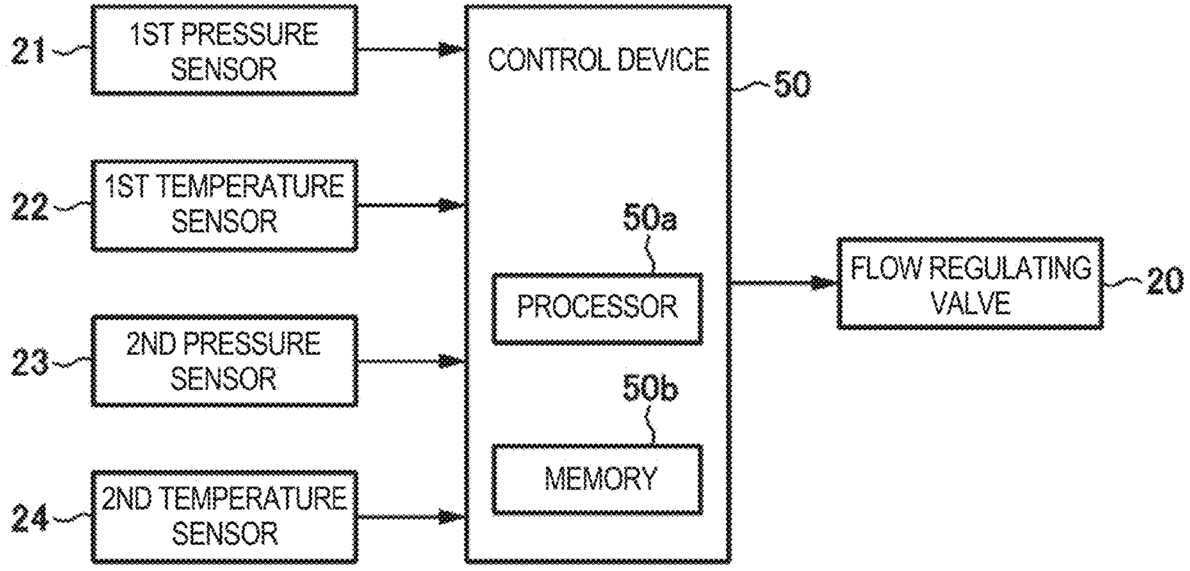
FIG. 3 is a block diagram illustrating an electric configuration of the refrigerant circulation system according to this embodiment.

Next, an electric configuration of the refrigerant circulation system 100 is described with reference to FIG. 3. FIG. 3 is a block diagram illustrating the electric configuration of the refrigerant circulation system 100 according to this embodiment.

As illustrated in FIG. 3, the refrigerant circulation system 100 has, in addition to the flow regulating valve 20, the first temperature sensor 22, the second pressure sensor 23, and the second temperature sensor 24 which are described above, a first pressure sensor 21 which detects a pressure of the refrigerant after it is compressed by the compressor 3 (i.e., a pressure of the refrigerant supplied to the heat exchanger 5 from the compressor 3), and a control device 50. The control device 50 is configured by a computer provided with one or more processors (typically, CPUs) 50*a*, and a memory 50*b*, such as a Read-Only Memory (ROM) and a Random Access Memory (RAM), which stores various kinds of programs (a primary control program, such as an Operating System (OS), and an application program which runs on the OS and realizes a specific function) which are interpreted and executed on the processor 50*a*, and various kinds of data.

In detail, the control device 50 controls the flow regulating valve 20 of the motor 1 based on the pressures and the temperatures detected by the first pressure sensor 21, the first temperature sensor 22, the second pressure sensor 23, and the second temperature sensor 24. Especially, in this embodiment, the control device 50 controls an opening of the flow regulating valve 20 (adjusts the flow rate of the refrigerant) to adjust the degree of overheat in the refrigeration cycle realized by the refrigerant circulation system 100 so as to prevent the liquid-state refrigerant from flowing from the motor 1 into the compressor 3 (liquid flow-back).

[Flow Rate Control Method]

Next, a controlling method (flow rate control method) which the control device 50 performs to the flow regulating valve 20 of the motor 1 in this embodiment is described concretely.

Figure 4:
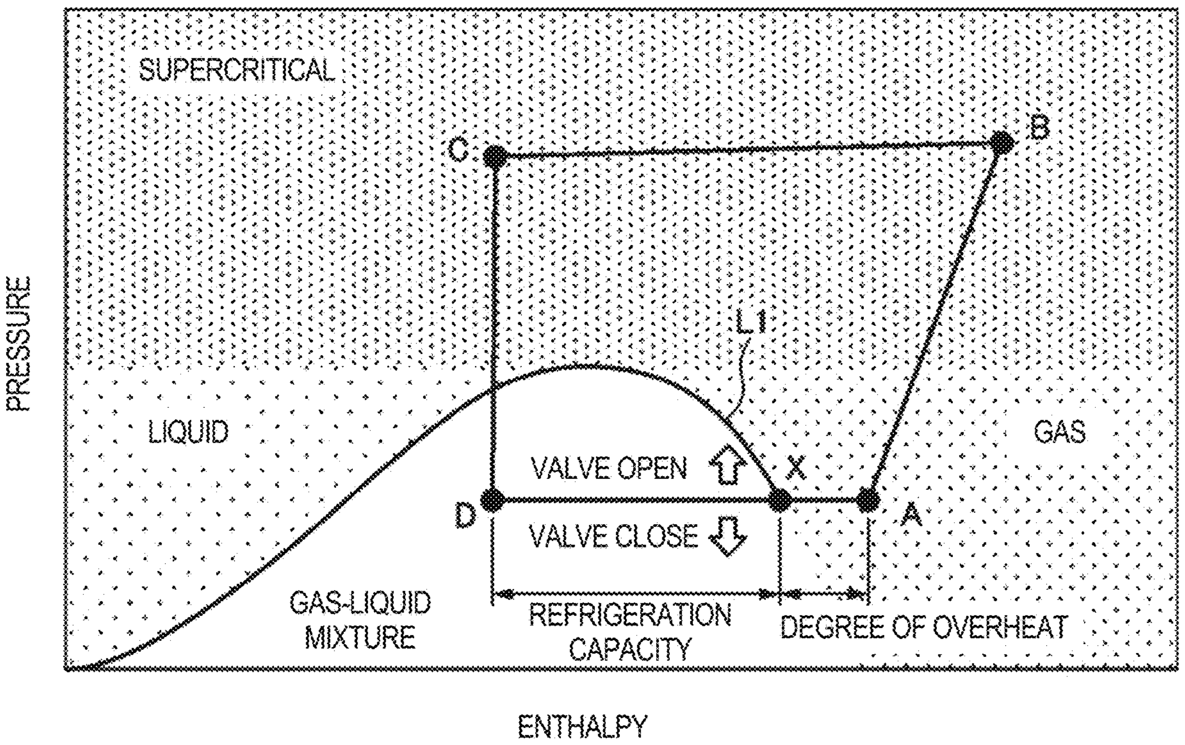
FIG. 4 is a diagram illustrating the basic concept of a flow rate control method according to this embodiment.

First, referring to FIG. 4, the basic concept of the flow rate control method according to this embodiment is described. FIG. 4 indicates enthalpy and pressure in the horizontal axis and the vertical axis, respectively, and indicates the refrigeration cycle of the refrigerant ($CO_2$ refrigerant). Further, FIG. 4 includes ranges indicative of states which the refrigerant can take (in detail, each state of liquid, gas, gas-liquid mixture, and supercritical). In FIG. 4, a part surrounded by a curve L1 indicates the gas-liquid mixture. In other words, the curve L1 corresponds to a boundary between the gas-liquid mixture, the supercritical, the liquid, and the gas.

As illustrated in FIG. 4, the refrigeration cycle realized by the refrigerant circulation system 100 is repeatedly performed in the order of point A→point B→point C→point D. In detail, this refrigeration cycle includes a compression stroke which is performed by the compressor 3 from point A to point B, a condensation stroke which is performed by the heat exchanger 5 from point B to point C, an expansion stroke which is performed by the motor 1 from point C to point D (i.e., expansion of the refrigerant from the slide bearings 14 inside the motor 1 to the space 15*a* of the housing 15), and an evaporation stroke which is performed by the motor 1 from point D to point A (i.e., cooling (heat exchange) of the stator 12 by the refrigerant inside the motor 1).

Here, in the evaporation stroke from point D to point A, the enthalpy (quantity of heat) from point D to point X on the curve L1 (an intersection of a line segment DA and the curve L1) corresponds to the refrigeration capacity or capability (amount of cooling) by the refrigeration cycle of the refrigerant circulation system 100, and the enthalpy (quantity of heat) from point X to point A corresponds to the degree of overheat by the refrigeration cycle of the refrigerant circulation system 100. Generally, in the evaporator of the refrigeration cycle, a state where the refrigerant temperature increased above the saturated vapor temperature is referred to as "overheating," and the temperature difference is referred to as a "degree of overheat." Therefore, the degree of overheat can be obtained by subtracting the saturated vapor temperature according to the pressure at point D (a pressure when the evaporation stroke starts) from the temperature at point A (a temperature when the compression stroke starts). If the degree of overheat is increased, the refrigerant can certainly become the gas state when the compression stroke starts (i.e., before the compressor 3), and the liquid flow-back can be prevented. However, if the degree of overheat is too large, the refrigeration capacity drops (i.e., the stator 12 cannot be effectively cooled by the refrigerant).

Such a degree of overheat is adjustable by controlling the flow rate of the refrigerant by the flow regulating valve 20 of the motor 1. That is, as illustrated in FIG. 4, if the flow regulating valve 20 is controlled to the opening side to increase the flow rate of the refrigerant, the refrigeration capacity increases and the degree of overheat decreases. On the other hand, if the flow regulating valve 20 is controlled to the closing side to decrease the flow rate of the refrigerant, the refrigeration capacity decreases and the degree of overheat increases. On the other hand, the degree of overheat varies suitably according to the operating state of the vehicle 1 (i.e., the operating state of the refrigerant circulation system 100). Typically, the degree of overheat tends to change according to the calorific value of the coil of the stator 12 of the motor 1 (coil calorific value).

Thus, in this embodiment, the control device 50 adjusts the degree of overheat of the refrigeration cycle by controlling the flow regulating valve 20 of the motor 1 to prevent the liquid flow-back to the compressor 3, while securing the refrigeration capacity by the refrigerant. In detail, the control device 50 calculates the current degree of overheat (hereinafter, referred to as an "actual degree of overheat") in the refrigeration cycle. If the actual degree of overheat is larger than a target degree of overheat (hereinafter, simply referred to as a "reference value"), the control device 50 controls the flow regulating valve 20 to the opening side to increase the flow rate of the refrigerant. On the other hand, if the actual degree of overheat is smaller than the reference value, the control device 50 controls the flow regulating valve 20 to the closing side to decrease the flow rate of the refrigerant. Therefore, the degree of overheat is maintained at the reference value. Note that such a reference value is defined beforehand from the viewpoint of realizing both the refrigeration capacity by the refrigerant and the prevention of the liquid flow-back. Further, a reference value having a certain range may be used, and if the actual degree of overheat exceeds this range, the flow rate of the refrigerant may be increased, and if the actual degree of overheat is less than this range, the flow rate of the refrigerant may be decreased.

Figure 5:
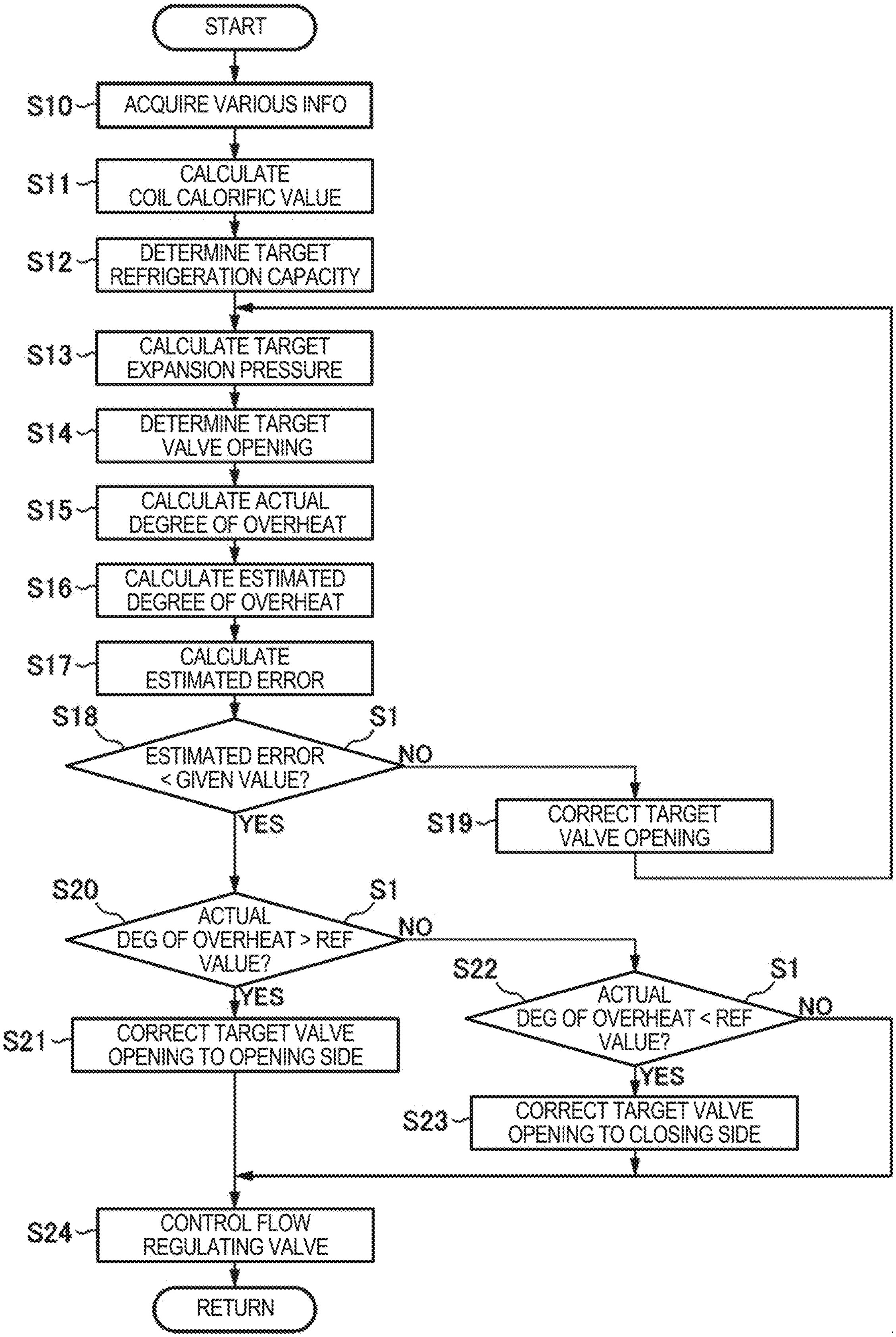
FIG. 5 is a flowchart illustrating the flow rate control method according to this embodiment.

Next, the flow rate control method according to this embodiment is described more concretely with reference to FIG. 5. FIG. 5 is a flowchart illustrating the flow rate control method according to this embodiment. This flow is repeatedly performed by the control device 50 at a given cycle. In more detail, by the processor 50*a* in the control device 50 reading the program stored in the memory 50*b* and executing this program, it realizes the flow rate control method according to this flow.

First, at Step S10, the control device 50 acquires varieties of information, such as the pressures and the temperatures, detected by the first pressure sensor 21, the first temperature sensor 22, the second pressure sensor 23, and the second temperature sensor 24. Then, at Step S11, the control device 50 calculates the coil calorific value according to the current amount (the amount of coil current) supplied to the stator 12 of the motor 1. The amount of coil current is a current amount corresponding to the control signal supplied to the motor 1 from the control device 50 (in detail, the current amount inputted into the stator 12 of the motor 1 via an inverter), and the coil calorific value is a calorific value which is determined uniquely from this amount of coil current.

Subsequently, at Step S12, the control device 50 determines a target refrigeration capacity to be realized by the refrigeration cycle in order to securely cool the stator 12 of the motor 1 based on the coil calorific value calculated at Step S11 (in other words, a demanded amount of cooling). For example, a value to be applied according to the coil calorific value (a quantity of heat to be removed by cooling) is defined beforehand as the target refrigeration capacity.

Subsequently, at Step S13, the control device 50 calculates a target expansion pressure to be set after the refrigerant expands, based on the target refrigeration capacity determined at Step S12. In detail, the control device 50 calculates the target expansion pressure (the pressure at point D) for realizing the target refrigeration capacity (the quantity of heat between point D and point X) based on the pressure of the refrigerant after it is compressed by the compressor 3 (the pressure at point B), which is detected by the first pressure sensor 21 from the refrigeration cycle realized by the refrigerant circulation system 100 illustrated in FIG. 4, and the temperature of the refrigerant before it is supplied to the slide bearings 14 (the temperature at point C), which is detected by the first temperature sensor 22 from the refrigeration cycle.

Subsequently, at Step S14, the control device 50 determines a target valve opening of the flow regulating valve 20 of the motor 1 for realizing the target expansion pressure calculated at Step S13. For example, a value (opening) to be applied according to the target expansion pressure is defined beforehand as the target valve opening.

Subsequently, at Step S15, the control device 50 calculates the current degree of overheat (the actual degree of overheat) in the refrigeration cycle based on the pressure of the refrigerant after it has flowed out of the slide bearings 14 (the pressure at point D, which is the current actual pressure and differs from the above-described target expansion pressure), which is detected by the second pressure sensor 23, and the temperature of the refrigerant after used for cooling of the stator 12 (the temperature at point A), which is detected by the second temperature sensor 24. In detail, the control device 50 calculates the actual degree of overheat by obtaining the saturated vapor temperature according to the pressure detected by the second pressure sensor 23, and subtracting the saturated vapor temperature from the temperature detected by the second temperature sensor 24.

Subsequently, at Step S16, separately from the above-described actual degree of overheat (first degree of overheat), the control device 50 calculates an estimated degree of overheat (second degree of overheat) based on the coil calorific value calculated at Step S11 and the target refrigeration capacity determined at Step S12. In detail, the control device 50 obtains the estimated degree of overheat by subtracting the quantity of heat corresponding to the target refrigeration capacity from the coil calorific value.

Subsequently, at Step S17, the control device 50 calculates an estimated error (absolute value) by subtracting the actual degree of overheat calculated at Step S15 from the estimated degree of overheat calculated at Step S16, or vice versa. Then, at Step S18, the control device 50 determines whether this estimated error is below the given value. As a result, if the control device 50 does not determine that the estimated error is below the given value (i.e., if the estimated error is the given value or more) (Step S18: No), the control device 50 moves to Step S19. At Step S19, the control device 50 corrects the target valve opening determined at Step S14 according to the magnitude of the estimated error (absolute value). Then, the control device 50 returns to Step S13 and repeats the processings at Step S13 and beyond.

On the other hand, if the control device 50 determines that the estimated error is below the given value (Step S18: Yes), the control device 50 moves to Step S20. At Step S20, the control device 50 determines whether the actual degree of overheat calculated at Step S15 is larger than the above-described reference value. As a result, if the control device 50 determines that the actual degree of overheat is larger than the reference value (Step S20: Yes), the control device 50 moves to Step S21, where it corrects the target valve opening to the opening side according to the difference (absolute value) between the actual degree of overheat and the reference value. Then, the control device 50 moves to Step S24, where the control device 50 controls the flow regulating valve 20 to set the flow regulating valve 20 to the target valve opening corrected at Step S21.

On the other hand, if the control device 50 does not determine that the actual degree of overheat is larger than the reference value (Step S20: No), the control device 50 moves to Step S22. At Step S22, the control device 50 determines whether the actual degree of overheat is smaller than the reference value. As a result, if the control device 50 determines that the actual degree of overheat is smaller than the reference value (Step S22: Yes), the control device 50 moves to Step S23, where it corrects the target valve opening to the closing side according to the difference (absolute value) between the actual degree of overheat and the reference value. Then, the control device 50 moves to Step S24, where the control device 50 controls the flow regulating valve 20 to set the flow regulating valve 20 to the target valve opening corrected at Step S23.

On the other hand, if the control device 50 does not determine that the actual degree of overheat is smaller than the reference value (Step S22: No), the control device 50 moves to Step S24. In this case, since the actual degree of overheat is maintained at the reference value, the control device 50 controls the flow regulating valve 20 to set it to the target valve opening, without correcting the target valve opening.

Figure 6:
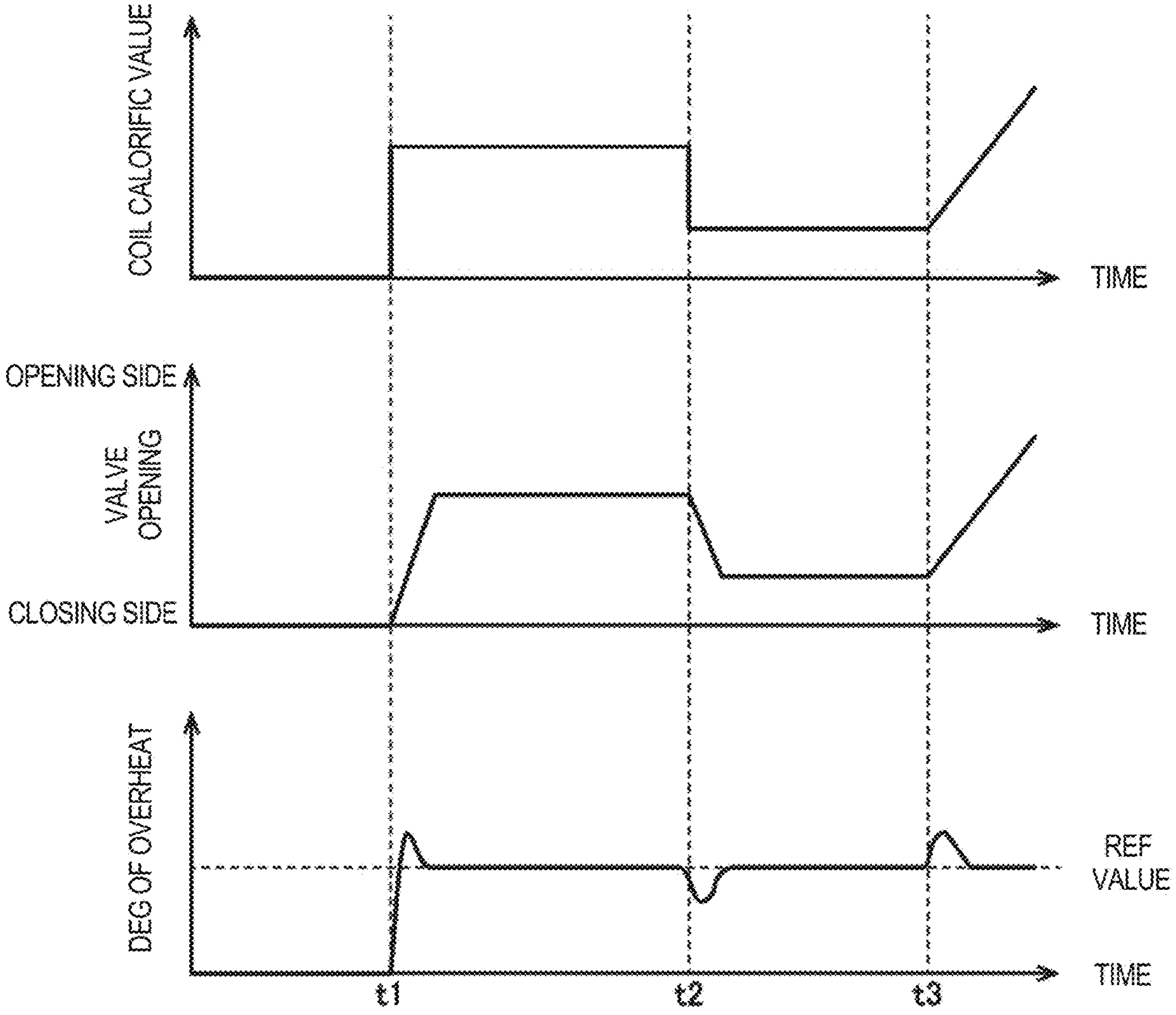
FIG. 6 is a time chart illustrating the flow rate control method according to this embodiment.

Next, FIG. 6 is a time chart illustrating the flow rate control method according to this embodiment. FIG. 6 illustrates a time change in each of the coil calorific value, the valve opening of the flow regulating valve 20 of the motor 1, and the degree of overheat of the refrigeration cycle (the actual degree of overheat). As illustrated in FIG. 6, the flow regulating valve 20 is set to the opening side because the coil calorific value increases from time t1. Although the degree of overheat changes in connection with this, the degree of overheat is promptly maintained at the reference value by adjusting the opening of the flow regulating valve 20. Subsequently, the flow regulating valve 20 is set to the closing side because the coil calorific value decreases from time t2. Although the degree of overheat changes in connection with this, the degree of overheat is promptly maintained at the reference value by adjusting the opening of the flow regulating valve 20. After this, a similar flow rate control method is performed at time t3.

Operation and Effects

Next, operation and effects of the refrigerant circulation system 100 according to this embodiment are described.

In this embodiment, the refrigerant circulation system 100 which circulates refrigerant containing $CO_2$ comprises the compressor 3 which compresses the refrigerant, the motor 1 including the rotor 11 and the stator 12, the rotation shaft 13 coupled to the rotor 11, and the slide bearings 14 which are lubricated using the refrigerant compressed by the compressor 3 and supports the rotation shaft 13. The motor 1 is configured to use the refrigerant which passes through the inside of the motor 1. The refrigerant expands after it has flowed out of the slide bearings 14 and is then used for cooling of the stator 12. The refrigerant circulation system 100 also comprises the control device 50 configured to control at least the motor 1. The motor 1 further includes the flow regulating valve 20 which is able to adjust the flow rate of the refrigerant, the control device 50 controls the flow regulating valve 20 of the motor 1 to adjust the degree of overheat in the refrigeration cycle of the refrigerant realized by the refrigerant circulation system 100.

According to such an embodiment, in the refrigerant circulation system 100 in which the slide bearings 14 of the motor 1 are lubricated by the refrigerant, and the motor 1 functions as the expansion valve and the evaporator in the refrigeration cycle, the degree of overheat of the refrigeration cycle can be adjusted securely by the flow regulating valve 20 controlling the flow rate of the refrigerant of the motor 1. Therefore, it can prevent the liquid-state refrigerant from flowing into the compressor 3 (liquid flow-back).

Further, according to this embodiment, the control device 50 calculates the current degree of overheat (actual degree of overheat) in the refrigeration cycle. If the actual degree of overheat is larger than the reference value, the control device 50 controls the flow regulating valve 20 to increase the flow rate of the refrigerant, and, on the other hand, if the actual degree of overheat is smaller than the reference value, the control device 50 controls the flow regulating valve 20 to decrease the flow rate of the refrigerant. That is, if the actual degree of overheat is larger than the reference value, the control device 50 increases the flow rate of the refrigerant to lower the degree of overheat, and, on the other hand, if the actual degree of overheat is smaller than the reference value, the control device 50 reduces the flow rate of the refrigerant to raise the degree of overheat. Therefore, it can maintain the degree of overheat at the given reference value, and it becomes possible to certainly prevent the liquid flow-back to the compressor 3.

Further, according to this embodiment, the refrigerant circulation system 100 comprises the first pressure sensor 21 which detects the pressure of the refrigerant after it is compressed by the compressor 3, and the first temperature sensor 22 which detects the temperature of the refrigerant before it is supplied to the slide bearings 14 of the motor 1. The control device 50 determines the target refrigeration capacity to be realized by the refrigeration cycle based on the coil calorific value, calculates the target expansion pressure after the refrigerant expands based on the target refrigeration capacity, the pressure detected by the first pressure sensor 21, and the temperature detected by the first temperature sensor 22, and determines the target flow rate of the refrigerant by the flow regulating valve 20 for realizing the target expansion pressure. If the actual degree of overheat is larger than the reference value, the control device 50 performs the correction to increase the target flow rate, and if the actual degree of overheat is smaller than the reference value, the control device 50 performs the correction to decrease the target flow rate, and the control device 50 controls the flow regulating valve 20 based on the corrected target flow rate. Therefore, it can securely realize both the cooling of the motor 1 (stator 12) by the refrigerant and the prevention of the liquid flow-back of the compressor 3.

Further, according to this embodiment, the refrigerant circulation system 100 further comprises the second pressure sensor 23 which detects the pressure of the refrigerant after it has flowed out of the slide bearings 14, and the second temperature sensor 24 which detects the temperature of the refrigerant after used for cooling of the stator 12. The control device 50 calculates the current degree of overheat (actual degree of overheat) in the refrigeration cycle based on the pressure detected by the second pressure sensor 23 and the temperature detected by the second temperature sensor 24. Therefore, it can obtain the actual degree of overheat with sufficient accuracy.

According to this embodiment, the control device 50 calculates the estimated degree of overheat based on the coil calorific value and the target refrigeration capacity, in addition to the actual degree of overheat calculated based on the pressure detected by the second pressure sensor 23 and the temperature detected by the second temperature sensor 24, and corrects the target flow rate according to the difference between the actual degree of overheat and the estimated degree of overheat. Therefore, according to the estimated error of the degree of overheat, it can securely carry out the feedback control of the flow rate of the flow regulating valve 20.

Modification(s)

Figure 7:
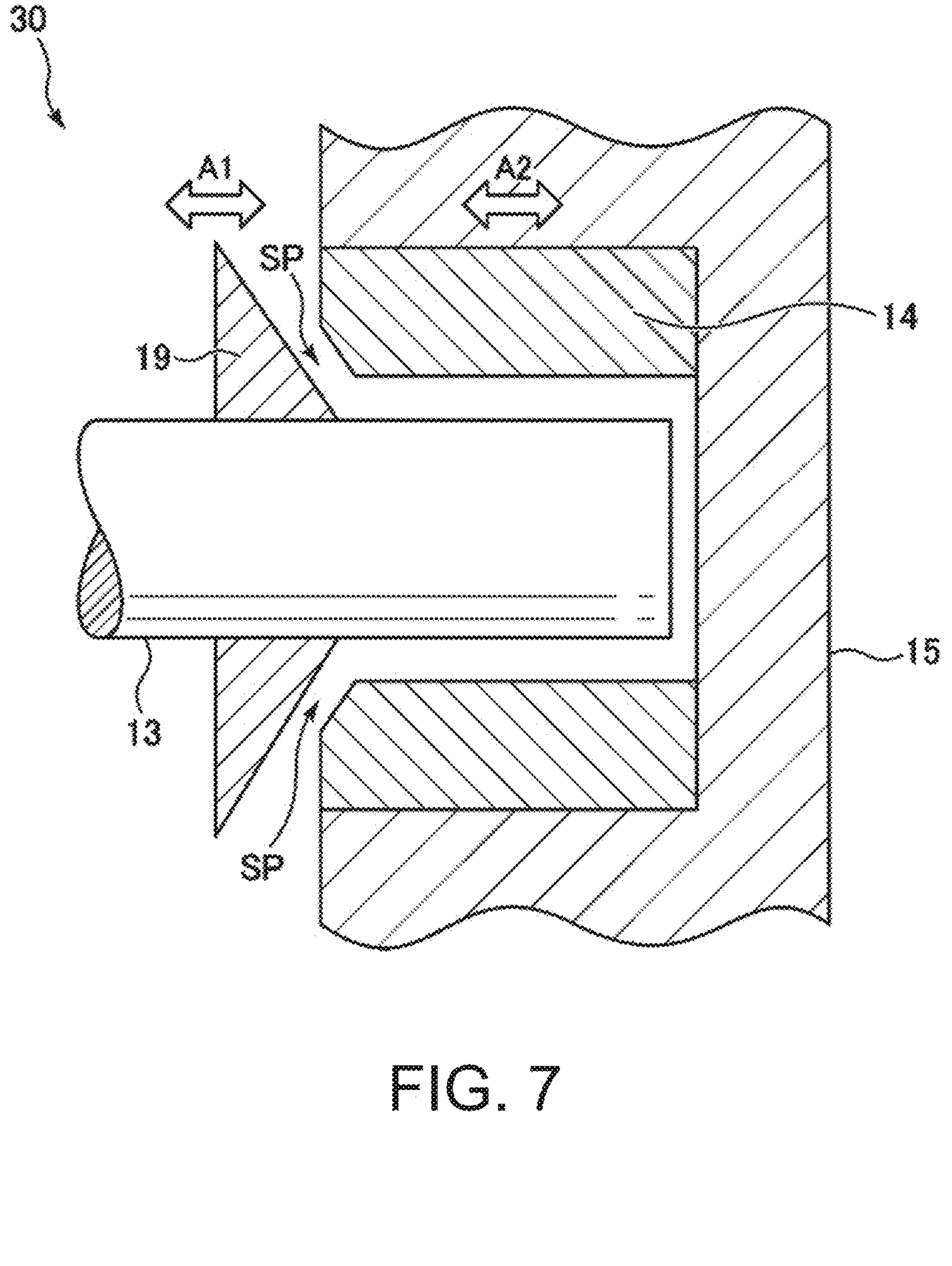
FIG. 7 is a diagram illustrating a flow rate adjustment mechanism according to a modification of this embodiment.

Although in the above embodiment the flow regulating valve 20 provided on the refrigerant supply passage 16 is illustrated as one example of the "flow rate adjustment mechanism," which is able to adjust the flow rate of the refrigerant of the motor 1, the flow rate adjustment mechanism is not limited to the flow regulating valve 20. Referring to FIG. 7, the flow rate adjustment mechanism according to a modification is described. FIG. 7 is an enlarged cross-sectional view illustrating the slide bearings 14 and the guide parts 19 in the motor 1. As illustrated in FIG. 7, the flow rate adjustment mechanism 30 according to this modification is configured to be able to adjust the flow rate of refrigerant by moving the guide parts 19 in the axial direction (arrow A1) or moving the slide bearings 14 in the axial direction (arrow A2) so that the size of the gap SP, into which the refrigerant flows, located between the guide part 19 and the end of slide bearing 14 on the guide part 19 side, is changed. The flow rate adjustment mechanism 30 is configured to move the guide parts 19 or the slide bearings 14 in the axial direction by various known actuators (not illustrated).

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Motor
3 Compressor
5 Heat Exchanger
11 Rotor
12 Stator
13 Rotation Shaft
14 Slide Bearing
16 Refrigerant Supply Passage
19 Guide Part
20 Flow Regulating Valve
30 Flow Rate Adjustment Mechanism
50 Control Device
100 Refrigerant Circulation System
200 Vehicle

What is claimed is:

1. A refrigerant circulation system configured to circulate refrigerant containing $CO_2$ therethrough, comprising:
- a compressor configured to compress the refrigerant;
- a motor, the motor including:
  - a rotor;
  - a stator;
  - a rotation shaft coupled to the rotor; and
  - slide bearings supporting the rotation shaft, the slide bearings being lubricated using the refrigerant compressed by the compressor, wherein the motor is configured so that the refrigerant passing through the inside of the motor expands after having flowed out of the slide bearings, and is used for cooling of one of the rotor and the stator; and
- a control device configured to control at least the motor,
- wherein the motor is further provided with a flow rate adjustment mechanism configured to be able to adjust a flow rate of the refrigerant, and
- wherein the control device is configured to control the flow rate adjustment mechanism of the motor to adjust a degree of overheat in a refrigeration cycle of the refrigerant realized by the refrigerant circulation system.

2. The refrigerant circulation system of claim 1, wherein the control device calculates the current degree of overheat in the refrigeration cycle, and when the degree of overheat is larger than a reference value, the control device controls the flow rate adjustment mechanism to increase the flow rate of the refrigerant, and when the degree of overheat is smaller than the reference value, the control device controls the flow rate adjustment mechanism to decrease the flow rate of the refrigerant.

3. The refrigerant circulation system of claim 2, further comprising:

a first pressure sensor configured to detect a pressure of the refrigerant after being compressed by the compressor; and a first temperature sensor configured to detect a temperature of the refrigerant before the refrigerant is supplied to the slide bearings of the motor, wherein the control device determines a target refrigeration capacity to be realized by the refrigeration cycle based on a calorific value of a coil applied to one of the rotor and the stator to be cooled, wherein the control device calculates a target expansion pressure after the refrigerant expands based on the target refrigeration capacity, the pressure detected by the first pressure sensor and the temperature detected by the first temperature sensor, wherein the control device determines a target flow rate of the refrigerant by the flow rate adjustment mechanism for realizing the target expansion pressure, and wherein, when the degree of overheat is larger than the reference value, the control device performs a correction to increase the target flow rate, and when the degree of overheat is smaller than the reference value, the control device performs a correction to decrease the target flow rate, and the control device then controls the flow rate adjustment mechanism based on the corrected target flow rate.

4. The refrigerant circulation system of claim 3, further comprising a second pressure sensor configured to detect a pressure of the refrigerant after having flowed out of the slide bearings, and a second temperature sensor configured to detect a temperature of the refrigerant after used for cooling of one of the rotor and the stator, wherein the control device is configured to calculate the current degree of overheat in the refrigeration cycle based on the pressure detected by the second pressure sensor and the temperature detected by the second temperature sensor.

5. The refrigerant circulation system of claim 4, wherein, when the degree of overheat calculated based on the pressure detected by the second pressure sensor and the temperature detected by the second temperature sensor is a first degree of overheat, the control device additionally calculates a second degree of overheat estimated based on the calorific value of the coil and the target refrigeration capacity, and wherein the control device corrects the target flow rate according to a difference between the first degree of overheat and the second degree of overheat.

6. The refrigerant circulation system of claim 5, wherein the motor is further provided with guide parts configured to direct the refrigerant immediately after having flowed out of the slide bearings toward the coil applied to one of the rotor and the stator to be cooled, and wherein the flow rate adjustment mechanism is configured to be able to adjust the flow rate of the refrigerant by moving one of the guide parts and the slide bearings in an axial direction so that the size of a gap from which the refrigerant flows out is changed, the gap being located between the guide part and an end of the slide bearing on the guide part side.

7. The refrigerant circulation system of claim 1, wherein the motor is further provided with guide parts configured to direct the refrigerant immediately after having flowed out of the slide bearings toward the coil applied to one of the rotor and the stator to be cooled, and wherein the flow rate adjustment mechanism is configured to be able to adjust the flow rate of the refrigerant by moving one of the guide parts and the slide bearings in an axial direction so that the size of a gap from which the refrigerant flows out is changed, the gap being located between the guide part and an end of the slide bearing on the guide part side.

8. The refrigerant circulation system of claim 2, further comprising a second pressure sensor configured to detect a pressure of the refrigerant after having flowed out of the slide bearings, and a second temperature sensor configured to detect a temperature of the refrigerant after being used for cooling of one of the rotor and the stator, wherein the control device is configured to calculate the current degree of overheat in the refrigeration cycle based on the pressure detected by the second pressure sensor and the temperature detected by the second temperature sensor.

9. The refrigerant circulation system of claim 2, wherein the motor is further provided with guide parts configured to direct the refrigerant immediately after having flowed out of the slide bearings toward the coil applied to one of the rotor and the stator to be cooled, and wherein the flow rate adjustment mechanism is configured to be able to adjust the flow rate of the refrigerant by moving one of the guide parts and the slide bearings in an axial direction so that the size of a gap from which the refrigerant flows out is changed, the gap being located between the guide part and an end of the slide bearing on the guide part side.

10. The refrigerant circulation system of claim 3, wherein the motor is further provided with guide parts configured to direct the refrigerant immediately after having flowed out of the slide bearings toward the coil applied to one of the rotor and the stator to be cooled, and wherein the flow rate adjustment mechanism is configured to be able to adjust the flow rate of the refrigerant by moving one of the guide parts and the slide bearings in an axial direction so that the size of a gap from which the refrigerant flows out is changed, the gap being located between the guide part and an end of the slide bearing on the guide part side.

11. The refrigerant circulation system of claim 4, wherein the motor is further provided with guide parts configured to direct the refrigerant immediately after having flowed out of the slide bearings toward the coil applied to one of the rotor and the stator to be cooled, and wherein the flow rate adjustment mechanism is configured to be able to adjust a flow rate of the refrigerant by moving one of the guide parts and the slide bearings in an axial direction so that the size of a gap from which the refrigerant flows out is changed, the gap being located between the guide part and an end of the slide bearing on the guide part side.

12. The refrigerant circulation system of claim 8, wherein the motor is further provided with guide parts configured to direct the refrigerant immediately after having flowed out of the slide bearings toward the coil applied to one of the rotor and the stator to be cooled, and wherein the flow rate adjustment mechanism is configured to be able to adjust the flow rate of the refrigerant by moving one of the guide parts and the slide bearings in an axial direction so that the size of a gap from which the refrigerant flows out is changed, the gap being located between the guide part and an end of the slide bearing on the guide part side.

* * * * *